July 7, 1936.  P. J. BROWNSCOMBE  2,046,723
FILM DRIVING APPARATUS
Filed July 20, 1934  3 Sheets-Sheet 1
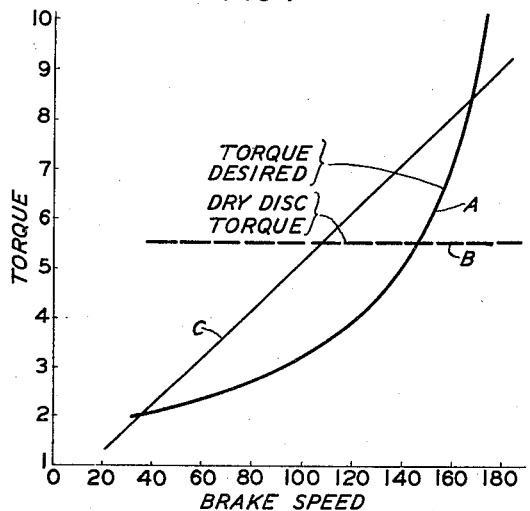
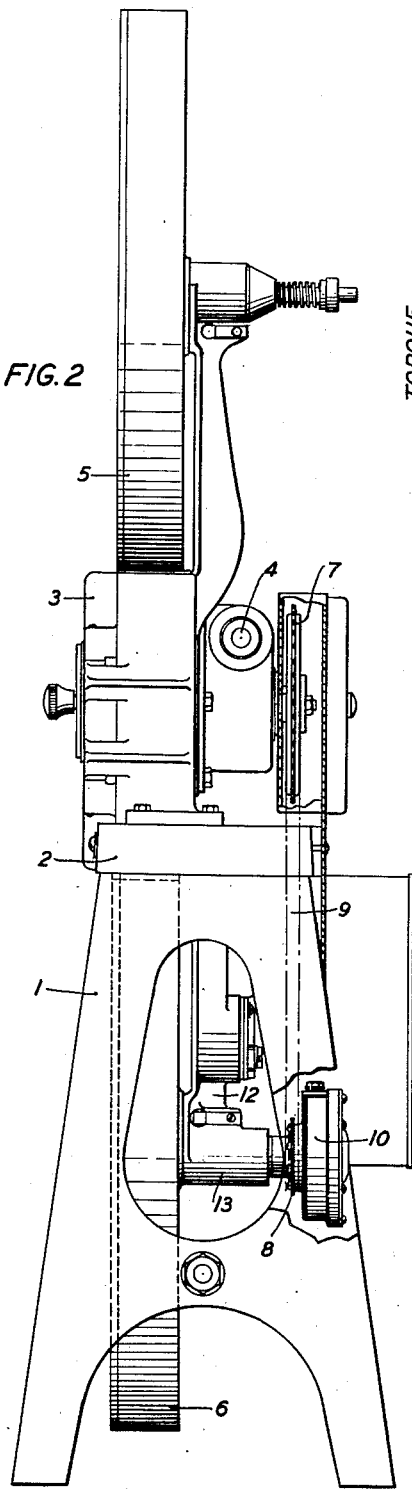
INVENTOR
P.J. BROWNSCOMBE
BY
G.H. Heydt
ATTORNEY July 7, 1936.  P. J. BROWNSCOMBE  2,046,723
FILM DRIVING APPARATUS
Filed July 20, 1934  3 Sheets-Sheet 2

INVENTOR
P. J. BROWNSCOMBE
BY
G. N. Heydt
ATTORNEY

July 7, 1936.   P. J. BROWNSCOMBE   2,046,723
FILM DRIVING APPARATUS
Filed July 20, 1934   3 Sheets-Sheet 3

INVENTOR
P. J. BROWNSCOMBE
BY
G. H. Heydt
ATTORNEY

Patented July 7, 1936

2,046,723

UNITED STATES PATENT OFFICE 2,046,723

FILM DRIVING APPARATUS

Philip J. Brownscombe, East Orange, N. J., assignor to Bell Telephone Laboratories, Incorporated, New York, N. Y., a corporation of New York Application July 20, 1934, Serial No. 736,175

6 Claims. (Cl. 242—55)

This invention relates to film recording and reproducing apparatus and more particularly to an improved mechanism for driving the film take-up reel employed in such apparatus.

It has been found, particularly in connection with sound film recording and reproducing apparatus, that the dry disc friction clutch now in general use for coupling the take-up reel and the film drive mechanism of such apparatus, possesses many undesired features adversely affecting the uniform operation required of such apparatus.

It has been found that with the use of a dry disc friction clutch as the coupling between the driving mechanism and the take-up reel there is a jerk on the film when the machine is started due to the fact that the starting torque is greater than the running torque. A further disadvantage resides in the fact that the torque imparted is nearly independent of the take-up reel speed, which results in an excessive film tension when the roll of film on the reel is small and an insufficient film tension when the film roll is large. Other disadvantages may be enumerated, such as, irregular performance due to the wearing of the discs.

The main object of the invention is to provide a film take-up reel driving mechanism which will produce a constant tension on the film at all times during the operation of the film driving mechanism.

A further object of the invention is to provide a take-up reel driving mechanism in which the driving torque will increase as the speed of the take-up reel decreases due to an increase in the diameter of the film roll wound thereon.

A feature of the invention lies in the provision of a fluid friction coupling between the constant speed driving means and the take-up reel shaft.

A further feature of the invention lies in the provision of a fluid friction coupling between the constant speed driving means and the take-up reel shaft incorporating means for compensating for irregularities in the operation of the coupling caused by temperature changes.

In accordance with this invention there is provided a coupling between the constant speed driving means and the take-up reel in the form of an oil-filled revolving housing bearing a driving sprocket to be positively connected to the driving means, and a rotor within the housing, the rotor being connected to the take-up reel shaft.

The invention may be more clearly understood by reference to the accompanying drawings in which:

Fig. 1 shows torque speed characteristic curves for different types of take-up reel drives;

Fig. 2 shows a standard film recording machine with the power transmitting coupling of the invention attached thereto;

Figure 3:
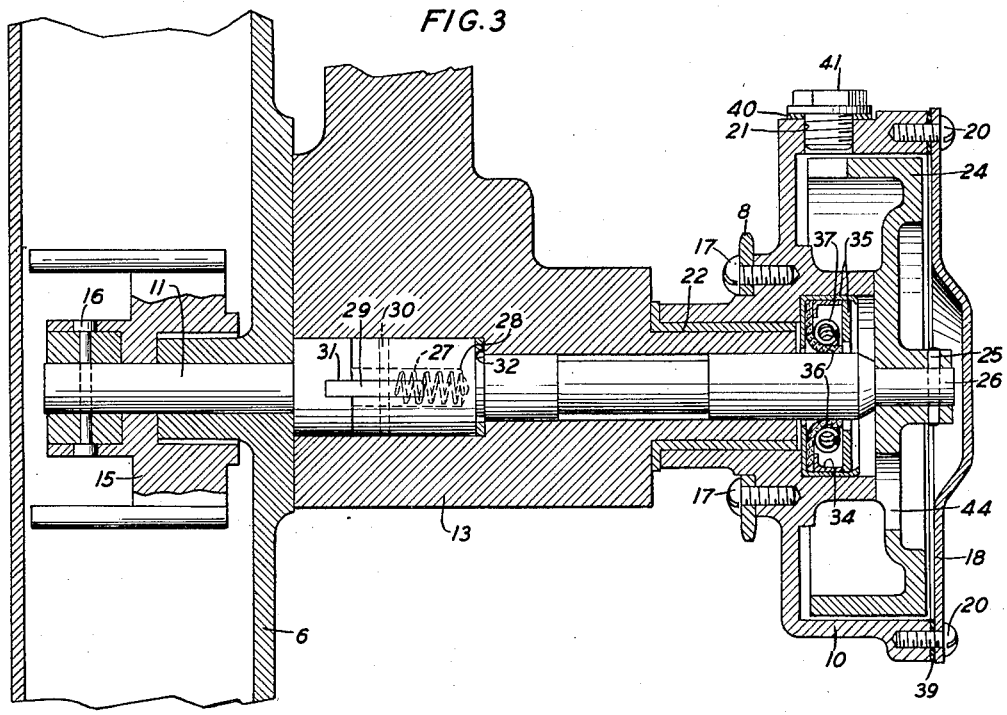
Fig. 3 is a detail in section of the coupling and take-up reel housing.

The type of clutch now employed between the constant speed driving shaft and the take-up reel of the majority of standard film driving machines is the well known dry friction disc clutch. It is known that the speed of the take-up reel decreases as the diameter of the film roll on the reel increases. With the use of a dry friction disc clutch the torque imparted is nearly independent of the take-up reel speed. This condition results in a varying tension on the film ranging from an excessive film tension when the diameter of the film roll is small to an insufficient film tension when the diameter of the film roll on the take-up reel is large. If a clutch of the dry friction disc type is adjusted to insure the taking up of the film when the diameter of the film roll is large, the film tension may become so excessive when the film roll is small that breaking of the film results.

An ideal driving clutch for coupling the constant speed driving shaft to a film take-up reel would be one which would maintain the film tension approximately constant irrespective of the diameter of the film roll on the take-up reel. In an ideal clutch of the type mentioned the driving torque would increase as the film roll speed decreased due to an increase in film roll diameter.

The curve A shown in Fig. 1 discloses a theoretical torque-speed characteristic of an ideal clutch mentioned above. The procedure to obtain the values necessary to enable the plotting of a torque-speed characteristic curve for an ideal clutch is as follows:

Throughout the specification the term "brake speed" defines the difference in angular speed of the constant speed driving shaft and the variable speed film reel. In the curve A the torque-speed characteristic curve was obtained by plotting different values of brake-speed against values of torque.

The speed of the film for a standard film driving machine is usually 90 feet per minute. This value of film speed will remain constant during operation.

From the results of numerous experiments, it is known that the desirable tension to which the film should be subjected is 500 grams. It is this value of tension that should be maintained uniform by the ideal clutch. This value (500 grams) should remain constant throughout.

The speed of the constant speed driving shaft to which the clutch is coupled is known to be 180 revolutions per minute in standard film driving machines. This value of angular speed of the constant speed driving shaft will remain constant throughout.

To obtain the values of torque and brake speed to enable the plotting of the torque-speed characteristic curve, the values given above are applied as follows:

$$\text{Torque} = \text{radius of film roll} \times \text{tension}$$

Any value of radius, say 1 inch to 8 inches, may be taken to obtain different values of torque for use in plotting the torque-speed characteristic curve. It is seen that as the tension remains constant at 500 grams the only variable in this equation will be the radius of the film roll.

Different values of brake speed are obtained in the following manner:

$$\text{Brake speed} = \text{angular speed of driving shaft} - \text{angular speed of take-up reel}$$

$$\text{Angular speed of take-up reel} = \frac{\text{film speed}}{2\pi \times \text{radius of film roll}}$$

Therefore, $$\text{Brake speed} = \text{angular speed of driving shaft} - \frac{\text{film speed}}{2\pi \times \text{radius of film roll}}$$

As the angular speed of the driving shaft in the above equation remains constant as also does the film speed, different values of brake speed may be obtained for different values of the radius of film roll.

By assuming different values of radius of film roll, many different values of torque and brake speed may be obtained and plotted against each other to give the torque-speed characteristic curve of an ideal clutch for coupling the driving shaft and take-up reel of a film driving machine.

The curve B, which is the torque-speed characteristic curve of a dry friction disc clutch, may be compared with the torque-speed characteristic of an ideal clutch shown by curve A.

In accordance with the present invention, there is provided a coupling suitable for use between the driving source and the take-up reel shaft of standard film recording or reproducing machines comprising an outer member or casing positively connected to the driving source to be rotated thereby and an inner member positively connected to the take-up reel shaft. The inner member, and consequently the take-up reel, is driven by the outer member or casing through the medium of a viscous fluid, such as oil, contained in the casing. The closer the spacing between the rotor and housing the greater will be the turning effort which is produced by shearing the fluid, for this increases the rate of shear as does increasing the relative velocity between the parts. Since one part revolves at constant angular velocity, the slip between the two and consequently the torque is increased by diminishing the speed of the other. Therefore, as the film reel coupled to the drive motor becomes filled and turns more slowly, it turns with greater force thus tending to maintain the film tension.

Results from actual test made with a coupling constructed in accordance with this invention disclose that the torque characteristic thereof approximates the torque characteristic of an ideal coupling as shown by curve A of Fig. 1. It will be seen by reference to Fig. 1 that although the torque characteristic of applicant's drive, as represented by curve C, does not match the torque characteristic of an ideal coupling, represented by curve A, it nevertheless shows a great improvement in torque characteristic over the dry disc coupling now employed in standard film driving machines and represented by curve B.

Fig. 2 shows a standard sound film recording machine the details of which are disclosed in U. S. Patent 1,728,304, September 17, 1929, to H. Pfannenstiehl. Numeral 1 indicates the supporting legs for base 2 on which is mounted a casing 3 containing film driving sprockets. These sprockets within the casing 3 are driven by means of a driving shaft 4. The sprockets in the apparatus casing 3 draw the film from a feed reel mounted in a housing 5 and feed the film to a take-up reel mounted in a housing 6. A sprocket 7 gear-connected to driving shaft 4 is positively connected to a sprocket 8 by means of a chain 9. The sprocket is secured to the outer casing of a power transmitting coupling 10 through which the shaft 11 (Fig. 3) bearing the take-up reel is driven. The take-up reel housing 6 is secured to the underside of the base 2 in any suitable manner. An arm 12 secured to the base 2 terminates in a portion 13 which forms a bearing surface in which the take-up reel shaft 11 rotates.

Figure 4:
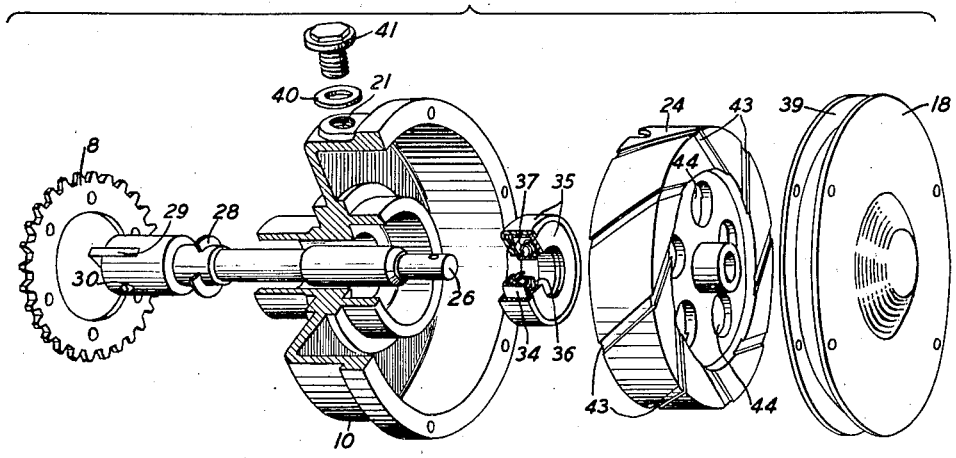
Fig. 4 is an exploded view of the coupling shown in Fig. 3.

Referring to Figs. 3 and 4, the shaft 11 extends through the housing 6 and into the bearing member 13. A member 15 is secured to the free end of shaft 11 by means of pin 16. The central portion of a take-up reel to be employed fits over member 15 to be rotated thereby. The outer casing or driving member of the coupling 10 is rotated by the gear 8 which is secured thereto by means of screws 17. A cover 18 is secured to the housing by means of screws 20 to form an enclosed housing into which oil or some other suitable fluid is poured through an opening 21. The coupling 10 rotates on a bearing surface 22 of some suitable material secured to the member 13.

A driven member 24, of coupling 10, is secured by a pin 25 to the end of a shaft 26. The other end of shaft 26 has a slotted portion 27. A coil spring 28 is located in the slot 27 to bear against a tongue member 29. This tongue member has an elongated slot therein (not shown). A pin 30 extends through this slot and is secured to shaft 26. The pin prevents ejection of member 29 but in conjunction with the slot permits motion of tongue 29 along the axis of shaft 26. It will be seen that the tongue 29 may be urged into groove 27 against the action of spring 28. One end portion of shaft 11 has a groove 31 therein to receive the tongue 29 to produce a driving connection between the two shafts 26 and 11. The purpose of this particular shaft connection is to enable the take-up reel housing 6 to be mounted in operating position with a minimum of trouble. As the housing 6 is mounted on the base member 2 the end of shaft 11 is inserted into member 13. If the groove 31 and tongue 29 are not in line, the tongue will be pushed into groove 27. After the housing 6 is mounted, either shaft 11 or 26 may be rotated by hand until the tongue 29 slips into groove 31 under the direction of spring 28. The enlarged portion of shaft 26 bears against the shoulder portion 32 of member 13 to hold the shaft in position in member 13.

To prevent oil in the housing 10 from leaking out along the shaft 26, a seal 34 is provided. The seal here shown is a standard type seal and comprises essentially the outer metal members 35, a leather washer 36 held against the shaft 26 by means of a circular coil spring 37. When the machine is started from rest, the friction between washer 36 and the shaft 26 is sufficient to cause a slight rotation of shaft 26 to overcome the inertia of the shaft and driven member 24 of the coupling. The starting friction supplied by the oil seal washer insures immediate rotation of the reel hub 15 for the brief period between the time of commencement of rotation of gear 8 and the time the driven member 24 rotates under the driving action of the driven member 10 and the viscous fluid of the coupling. The seal is constructed in one unit as shown in Fig. 4. A washer 39 is held between the cover 18 and the housing 10 to prevent fluid leakage at the cover. A washer 40 is held against housing 10 by means of oil plug 41 which is inserted into opening 21 in the housing.

Local heating of the oil or other fluid used as a driving medium between the members 10 and 24 would tend to produce a change in the viscosity of the fluid which in turn would cause a variation or change in the torque characteristic of the coupling. To avoid such a condition the rotor or drum member 24 is provided with helical grooves 43 and holes 44 to allow free circulation of the fluid within the housing 10.

Figure 5:
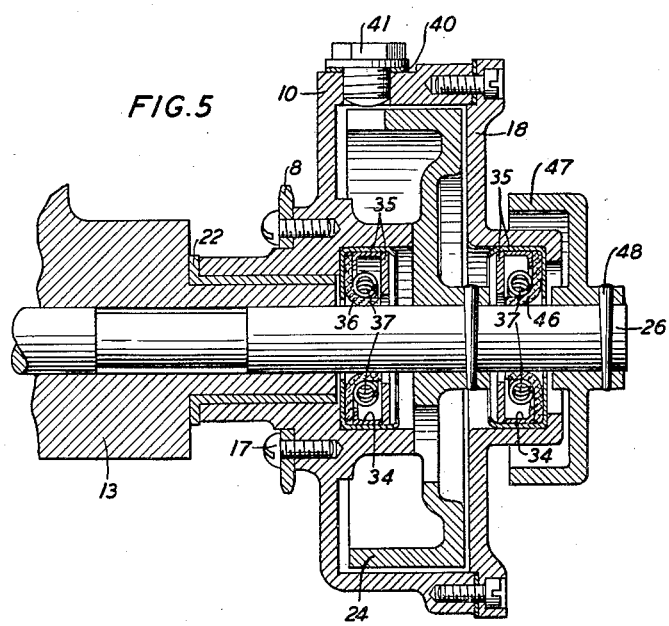
Fig. 5 is a detail in section of the coupling incorporating certain modifications.

In Fig. 5 the power transmitting coupling is shown modified to include means external to the coupling to permit the shafts 26 and 11 to be rotated by hand for the initial winding of a small length of film on the take-up reel when threading the machine. The elements of the coupling shown are the same as that shown in Figs. 3 and 4 with the exception that the shaft 26 extends outside the housing 10 and a second fluid seal 46 is provided to prevent leakage of the driving fluid along the shaft 26. A knob 47 is secured to the end of shaft 26 by means of a pin 48. By means of the knob 47 the take-up reel mounted on shaft 11 may be turned manually for the purpose mentioned above.

Figure 6:
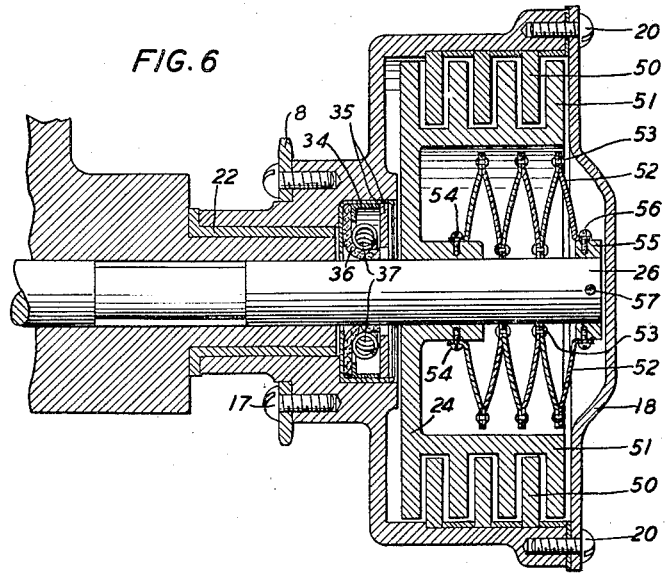
Fig. 6 is a detail in section of a modified coupling incorporating means for compensating for change in viscosity of the driving fluid with temperature change.

Fig. 6 discloses a fluid friction power transmitting coupling suitable for use between the driving source and take-up reel shaft of portable film recording and reproducing apparatus. Where fluid friction couplings of the type disclosed herein are applied to portable apparatus, the coupling is subjected to widely different temperature conditions. Such wide temperature changes will cause a change in the torque characteristic of the coupling due to a change in the viscosity of the fluid used as the driving medium. With the use of a coupling as shown in Fig. 6, the torque characteristic of the coupling is automatically maintained uniform regardless of the temperature conditions.

In this modification the housing 10 has internally projecting discs 50 which are interleaved with projecting discs 51 of the driven member 24. The driven member 24 is slidable along shaft 26. Bimetallic strips 52 are joined together as at 53, connected to member 24 at 54 and to a collar 55 at 56. The collar is attached to the shaft 26 by a pin 57. It will be seen that the shaft 26 is driven by member 10 through the medium of the fluid friction between the interleaving disc, the member 24 and the strip 52.

As the torque characteristic of the coupling depends to an extent on the viscosity of the fluid employed, any change in the viscosity will cause a change in the fluid friction between the interleaving disc and consequently a change in the torque characteristic of the coupling. The thermostatic metal strips are designed to produce, for a certain temperature change, a movement of the member 24 and consequently a change in the spacing between the interleaving discs 50 and 51. In this manner the fluid friction between discs 50 and 51 is maintained uniform and therefore the torque characteristic of the coupling is maintained uniform automatically.

It will be seen from the above description that applicant has provided an efficient and compact take-up reel coupling capable of attachment to existing film recording and reproducing apparatus to produce therein a uniform tension on the film as it is fed from the film driving sprocket.

What is claimed is:

1. In a film handling apparatus, a driving means, a take-up reel shaft, means for connecting said shaft to said driving means, said means comprising a power transmitting coupling, said coupling comprising a fluid containing housing positively connected to said driving means, a rotor within said housing the surface of which is spaced from the inner surface of said housing, and means forming a connection between said rotor and said shaft responsive to temperature changes in a manner to vary the spacing between said housing and rotor member.

2. The combination in a film handling apparatus having a driving means, of a film take-up reel shaft, a fluid friction coupling connecting said shaft and said driving means, and means included in said coupling for compensating for irregularities in the operation of said coupling caused by temperature changes.

3. In a power transmitting system, a driving means, a driven means, a fluid friction coupling connecting said driving and driven means, and means included in said coupling for compensating for irregularities in the operation of said coupling caused by temperature changes.

4. In a power transmitting system, a driving means, a driven means, a power transmitting coupling connecting said driving and driven means, said coupling comprising a fluid containing housing positively connected to said driving means, a rotor within said housing the surface of which is spaced from the inner surface of said housing and having a connection to said driven means, and means responsive to temperature changes to produce a movement of said rotor to vary the spacing between said housing and said rotor.

5. In a film driving mechanism having film propelling sprockets, a source of power for said sprockets, a take-up reel casing, a bearing member having one end adjacent the center of said reel casing, an oil-filled housing rotatably mounted on the opposite end of said bearing member, a take-up reel shaft rotatably mounted in said bearing member having one end thereof extending into said reel casing and the other end thereof extending into said oil-filled housing, a rotor within said housing, means connecting said rotor to said shaft, and means connecting said source of power to said housing to produce rotation of said housing.

6. In a film driving mechanism having film propelling sprockets, a source of power for said sprockets, a take-up reel casing, a bearing member having one end adjacent the center of said reel casing, an oil-filled housing rotatably mounted on the opposite end of said bearing member, a take-up reel shaft rotatably mounted in said bearing member having one end thereof extending into said reel casing and the other end thereof extending into said oil-filled housing, a rotor within said housing, means connecting said rotor to said shaft, a gear secured to the exterior of said housing, and driving means connecting said source of power to said gear to produce rotation of said housing.

PHILIP J. BROWNSCOMBE.